Aug. 29, 1961  F. E. ELLIS  2,997,898
AUTOMATIC TRANSMISSION OF POWER
Filed March 19, 1959  3 Sheets-Sheet 1

INVENTOR
FREDERICK E. ELLIS
BY *Imirie & Smiley*
ATTORNEYS

Aug. 29, 1961  F. E. ELLIS  2,997,898
AUTOMATIC TRANSMISSION OF POWER
Filed March 19, 1959  3 Sheets-Sheet 2
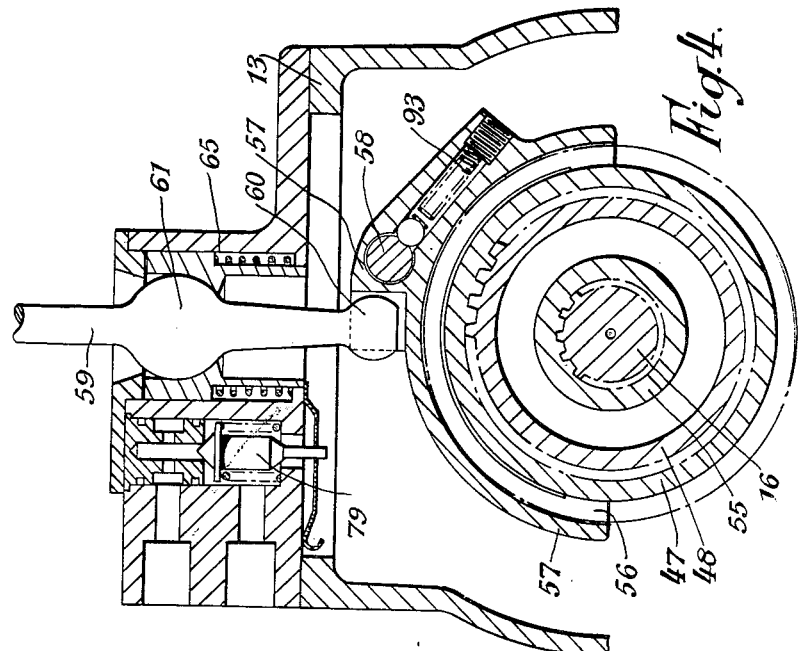
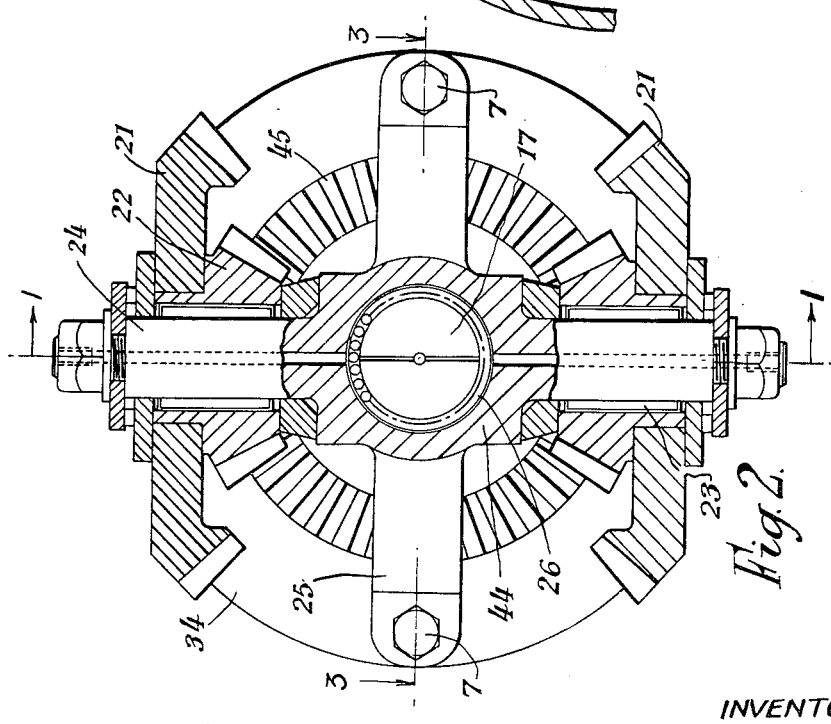
INVENTOR
FREDERICK E. ELLIS
BY *Imirie & Smiley*
ATTORNEYS

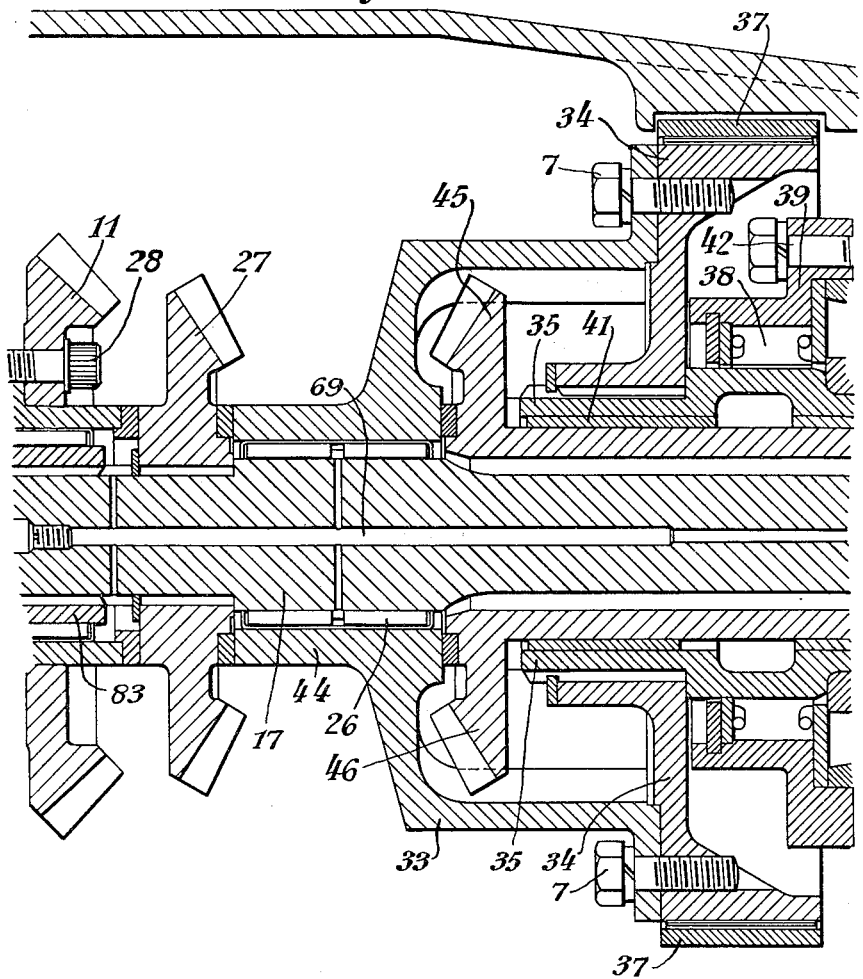

United States Patent Office 2,997,898
Patented Aug. 29, 1961

2,997,898
AUTOMATIC TRANSMISSION OF POWER
Frederick Edward Ellis, Tachbrook Mallory, near Leamington Spa, England, assignor to Automotive Products Company Limited and Hugh Cecil Reid
Filed Mar. 19, 1959, Ser. No. 800,457
Claims priority, application Great Britain Mar. 26, 1958
3 Claims. (Cl. 74—777)

The invention relates to two-speed forward and reverse epicyclic gearing in which a main driving bevel wheel and a smaller co-axial forward bevel wheel mesh respectively with an outer planet bevel pinion and an inner smaller planet bevel pinion, the two gear ratios being different, both pinions being rotatable together about a transverse axis of a planet carrier spindle, the said carrier axis being rotatable only in a forward direction in a plane perpendicular to the common axis of the main driving and forward bevel wheels, while means is provided for preventing rotation of the planet pinions about their axes to give a direct drive, or for allowing such rotation but preventing backward rotation of the planet carrier thus giving a drive through the gearing at a different transmission ratio while a reverse bevel wheel coaxial with the forward bevel wheel meshes with the inner planetary pinion on the side thereof opposite to the forward bevel wheel and means is provided for connecting a final rotatable driven shaft or like driven member to the forward or to the reverse bevel wheel.

In this kind of gearing, it is necessary to make provision for preventing rotation of the planet pinions about their axes thus giving a direct forward drive or for allowing such rotation but preventing backward rotation of the planet carrier thus giving a forward drive through the gearing at a different transmission ratio.

This result is achieved according to the present invention by providing a friction clutch for connecting the main driving bevel wheel and the forward bevel wheel to one another to give a direct high ratio drive, the clutch when inoperative enabling an indirect drive through the gearing to become operative, the planet carrier being then held against backward rotation.

Improvements in this kind of gearing have also been disclosed in the U.S. copending application, Serial No. 781,696 in which centrifugally operated means on the planet carrier effectively connect the main driving bevel wheel and the forward bevel wheel to one another to give a high speed forward drive and when inoperative enable a low speed indirect forward or reverse drive to become operative, the planet carrier being then held against backward rotation.

The principal object of the invention is to ensure that changes of gear are brought about in a simple manner.

It is also an object of the invention to bring about changes of gear without shock or noise.

It is a further object of the invention to provide a simple and compact form of gearing.

In the embodiment of the invention shown by way of example in the accompanying drawings:

FIGURE 2 shows a transverse sectional elevation on the line 2—2 in FIGURE 1;

FIGURE 3 shows a horizontal section of the epicyclic gear on the line 3—3 of FIGURE 2; and FIGURE 4 shows a vertical section on the line 4—4 in FIGURE 1.

Figure 1:
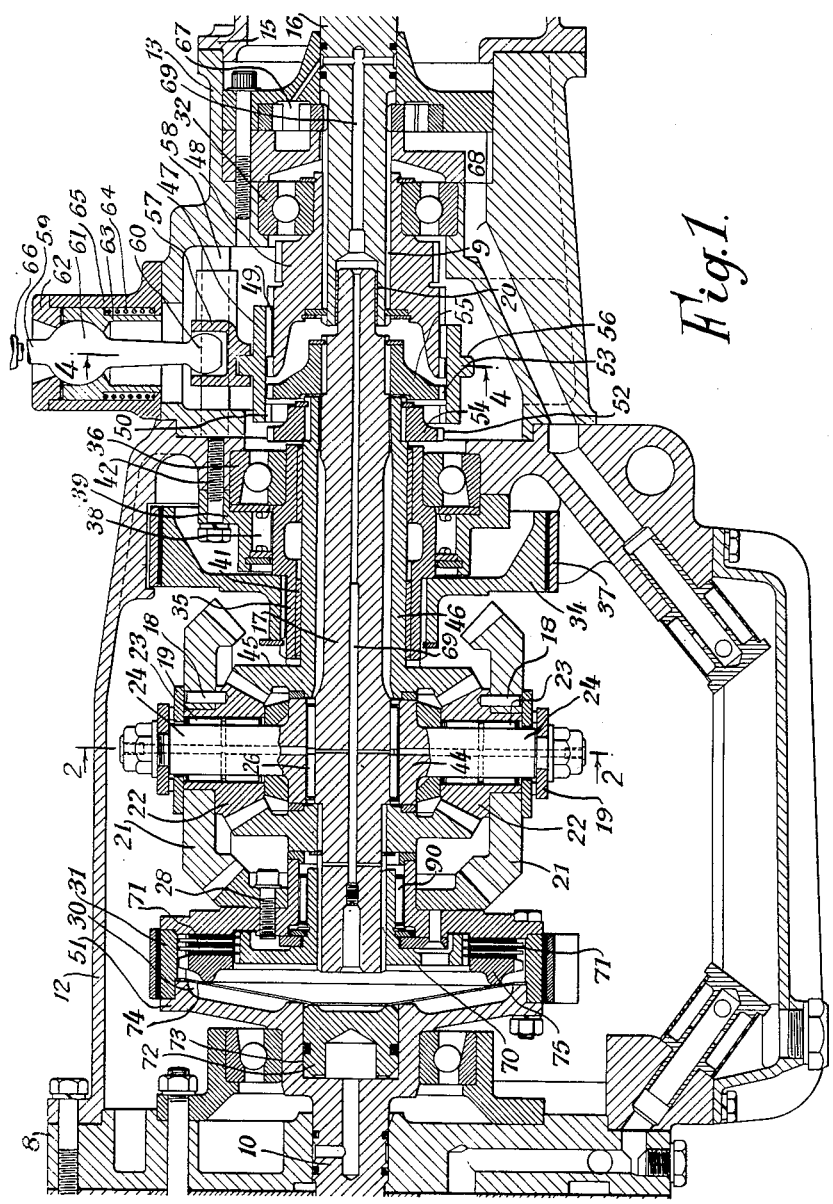
FIGURE 1 shows a longitudinal sectional elevation on the line 1—1 in FIGURE 2.

The drawings show the variable speed gearing to which the improvements constituting the present invention are applied as well as their association with the means for providing a reverse gear and with some of the driving and driven elements in a motor vehicle transmission system.

Referring particularly to FIGURES 1 and 2, the clutch shaft 10 transmits engine rotation to the main driving bevel wheel 11 forming the first element of the improved variable speed gearing located within the casings 12 and 13 which are bolted together. One end of the casing 12 is bolted to the rear closure 8 of the usual clutch housing and to the housing itself (not shown), the forward end of which is bolted to the engine crankcase (also not shown). The clutch housing may, for example, enclose an automatic clutch, or a hydrokinetic torque converter to effect the connection or disconnection of the driving bevel wheel 11 from the crankshaft of an engine or from the output shaft of any other prime mover.

To the end of the casing 13 there is bolted a rear casing 15 carrying a bearing for the rear end (not shown) of the final driven shaft 16 or like driven member of the variable speed gear. The front end of the final shaft 16 is supported in the casing 13 by a ball bearing 32.

The front end of an intermediate shaft 17 is rotatably supported from the rear end of the clutch shaft 10 by means which will be described hereinafter. The rear end of the intermediate shaft is supported from the final driven shaft 16 by means of a spigot bearing 20.

The main driving bevel wheel 11 meshes with the first or outer bevel planet pinions 21; in the present construction two pinions 21 are balanced about the central longitudinal axis of the clutch shaft 10 and of the intermediate and final driven shafts 17, 16.

Each planet pinion 21 is connected to a second or inner planet pinion 22, the connection including a pin 18 and a clamping plate 19. The two connected pinions are carried by roller bearings 23 on a spindle 24 at right angles to the longitudinal axis of the gearing. The two spindles 24 form part of the planet carrier 25, the hub 44 of the carrier being mounted through the medium of roller bearings 26 on the intermediate shaft 17. Two opposed balanced groups of planet pinions 21, 22 are employed in this construction.

The smaller planet pinions 22 mesh with a forward bevel wheel 27 splined on the intermediate shaft 17.

The hub 44 of the planet carrier 25 is connected by arms 33 and bolts 7 to a brake drum 34 which is connected rigidly by splines or otherwise to a sleeve 35, this method of mounting the carrier being shown in FIGURE 3. The planet carrier 25, the brake drum 34 and the sleeve 35 thus rotate as a whole and are supported at the front end by the bearing rollers 26 on the intermediate shaft 17 and at the rear end by a ball bearing 36 having its outer race mounted in the casing 12. The planet carrier assembly may be held against rotation in either direction by a brake band 37 applied to the drum 34 or by equivalent braking means. Alternatively, the planet carrier may be held against backward rotation by a one-way brake or a free wheel 38 interposed between the sleeve 35 and a fixed ring 39 connected by bolts 42 to the rear end of the casing 12. In the arrangement shown, two planet spindles 24 are arranged in line on opposite sides of the hub 44 and the arms 33 are located between them.

The input bevel wheel 11 drives the output wheel 27 via the bevel gear pinion assembly 21—22 at low speed when the planet carrier 25 is held against backward rotation by the brake 34—37 or the free wheel 38 or both.

The mechanism for bringing about a change of the forward gear ratio either up or down is located at the forward end of the epicyclic gearing, as shown in FIGURE 1, and includes as an essential feature a clutch for connecting the input bevel wheel 11 to the intermediate shaft 17. To change from low to high the clutch must be engaged hydraulically. To change from high to low the clutch must be released.

The bevel wheel 11 always rotates with the clutch shaft 10 since it is secured by set bolts 28 to the rear cover plate 29 of a clutch housing 30 comprising a brake drum 31 and a front plate 51 integral with or secured to the rear end of the clutch shaft 10. The clutch housing 30 forms the driving member of the clutch and the driven member 70 is connected to the forward bevel wheel 27 through the medium of the splined forward end of the intermediate shaft 17.

The splined forward end of the intermediate shaft 17 is supported from the clutch shaft 10 through the annular part of the driven member 70 of the clutch, roller bearings 90, the cover plate 29, the brake drum 31 and the front plate 51 of the clutch 30.

The friction plates 71 of the multiplate disc clutch in the construction shown are splined to the driven member 70, the intermediate frictional plates being splined to the drum 31. The plates are pressed together for the direct drive by the piston 72 of an hydraulic cylinder 73 in the end of the clutch shaft 10, through the medium of a polar lever or Belleville spring 74 and a pressure plate 75 splined to the housing.

The low speed ratio depends upon the difference between the speed ratios of (1) the driving bevel wheel 11 and the outer planet pinion 21 and (2) the inner planet pinion 22 and the forward bevel wheel 27. In the construction shown the first ratio is unity and the second or low speed ratio is 1:1.7. This is shown in FIGURE 1 by the difference between the conical angle of pitch surface of the outer gears 21, 11, namely 45°, and that of the inner gears 22, 27.

The two-speed gear so far described is provided with a reverse drive and a neutral adjustment.

For this purpose a reverse bevel wheel 45 is provided together with means for connecting the driven shaft 16 to either the forward bevel wheel 27 or the reverse bevel wheel 45. The two bevel wheels 27, 45 rotate oppositely since they mesh with opposite sides of the smaller second planetary pinions 22. The reverse bevel wheel 45 is shown integral with a hollow shaft 46 which is mounted by means of plain bushes 41 within the sleeve 35.

During forward low gear running, the planet carrier is held by the free wheel brake 38 or by the brake drum 34 against backward rotation. During reverse low gear running, the planet carrier tends to rotate forwardly and can then only be held against rotation by the brake drum 34.

The means for coupling the final driven shaft 16 to either the forward bevel wheel 27 or the reverse bevel wheel 45 will now be described, there being an intermediate or neutral position between the two adjustments.

This operation is effected by an internally splined actuating ring 47 concentric with the intermediate shaft 17 and the driven shaft 16 and adjustable axially. The rearward splines 49 on the ring 47 slidably engage the forward end of a fitting 48 having a rearward part of reduced diameter which is interposed between the inner race of the ball bearing 32 and the forward end of the driven shaft 16, the sleeve being permanently connected to the shaft by splines 9.

Splines 50, separated from the similar splines 49, are provided inside the ring 47 and are adapted when the ring is adjusted forwardly, to engage corresponding splines 52, on a circular fitting 54 connected to the rear end of the tubular reverse gear shaft 46. When the ring 47 is adjusted rearwardly, the splines 50 similarly engage splines 53 on a circular fitting 55 connected to the intermediate shaft 17. Forward adjustment of the sleeve 47 thus engages the reverse gear while rearward adjustment engages the forward gear.

The actuating ring 47 is connected to the selector lever 59 by a selector fork 57 slidable on a selector rod 58 fixed in the casing 13, as shown in FIGURE 4. The fork engages a concentric shoulder 56 on the ring 47, and the spherical or cylindrical lower end 60 of the selector lever 59 engages a recess in the fork 57.

The actuating lever is formed with a ball 61 which is mounted in a cylindrical shell 65 between a fixed upper socket 62 and a lower socket 63 loaded by a spring 64.

The handle or knob 66, on the upper end of the lever 59, enables the driver of a vehicle to adjust the lever forwardly to engage the forward low gear and rearwardly to engage the reverse gear having the same reduction ratio as the lower forward gear. The gear lever and parts actuated thereby are held in the forward, neutral or reverse positions by a spring operated ball and detent type lock 93 on the fixed selector rod 58.

When changing into reverse gear or vice versa, the two splined circular fittings 54, 55 should both be brought to rest before the actuating ring 47 is moved. Fluid pressure actuated mechanism for carrying out the reversing operation includes a valve 79, as shown in FIGURE 4 and as fully described in co-pending application Serial No. 781,696, filed December 19, 1958, and now Patent Number 2,982,155.

A rotary pump 67 actuated from the final driven shaft 16 draws oil from the sump through a central conduit 68 and forces the oil under pressure to several of the parts requiring lubrication through passages 69 in the shafts. Surplus oil from the parts so supplied lubricates other parts including the clutch plates 71.

For heavy vehicles, a second two-speed assembly may be provided in series with the other gears to obtain three forward speeds. It will be understood that the rearward gear assembly may be of stronger design than the forward gears in view of the greater torques to be transmitted when the lower gears are in operation.

I claim:

1. Two speed forward and reverse epicyclic gearing comprising, in combination: a fixed casing; co-axial driving, driven and intermediate shafts mounted in said casing for rotation with respect to each other and to the casing; a main driving bevel wheel on the driving shaft, and a smaller forward bevel wheel on the intermediate shaft; an outer planet bevel pinion meshing with said main driving wheel, and a smaller inner planet bevel pinion meshing with said forward bevel wheel, said bevel pinions being connected so as to rotate together; a planet carrier rotatably mounted on said intermediate shaft and having a spindle upon which the said bevel pinions are rotatably mounted; a reverse bevel wheel rotatably mounted and meshing with the inner bevel pinion on the side thereof opposite to the forward bevel wheel; a one-way brake connected between said carrier and the casing and preventing backward rotation of the planet carrier; a friction clutch operatively connecting the main driving bevel wheel and the forward bevel wheel to one another to give a high speed forward drive and when inoperative enabling a low speed indirect forward drive to become operative through the gearing connection from the main driving bevel wheel through the planet pinions to the forward bevel wheel and the reverse bevel wheel; toothed clutch members connected to the forward and the reverse bevel wheels respectively; a clutch member on the driven shaft selectively cooperable with each of said clutch members; a selector lever actuating said cooperable clutch member so as to selectively engage the clutch members of the forward gear and the reverse gear; a brake drum rotatable with the main driving bevel wheel, a braking element; means controlled by the selector lever to apply the braking element to said brake drum and thus bring the said toothed clutch members to rest, whereby the forward and reverse gear changes may be effected without shock.

2. Two speed forward and reverse epicyclic gearing as claimed in claim 1 comprising a multiplate clutch housing rotating with the driving shaft and the main driving bevel wheel, a clutch driven member enclosed in the clutch housing and rotatably connected to the forward output bevel wheel, and a plurality of friction plates splined alternately to the clutch housing and to the clutch driven member.

3. Two speed forward and reverse epicyclic gearing as claimed in claim 2, comprising a fluid actuated piston, a cylinder in which said piston reciprocates rotatable with the clutch housing and resilient means through which said piston engages the friction plates.

References Cited in the file of this patent

UNITED STATES PATENTS

| | | |
|---|---|---|
| 864,903 | Morse | Sept. 3, 1907 |
| 864,904 | Morse | Sept. 3, 1907 |
| 1,537,802 | Collins | May 12, 1925 |
| 2,080,937 | Starr | May 18, 1937 |
| 2,202,794 | Hanson | May 28, 1940 |
| 2,756,851 | Collins | July 31, 1956 |
| 2,883,026 | Banker | Apr. 21, 1959 |